Feb. 18, 1947.    J. BUCHER - GUYER    2,416,043
ROTARY FRUIT MILL COMBINED WITH ROTARY DISCHARGE CONVEYER
Filed March 7, 1945

Inventor:
Johann Bucher-Guyer
by Sommers & Young
Attorneys

Patented Feb. 18, 1947

2,416,043

UNITED STATES PATENT OFFICE 2,416,043

ROTARY FRUIT MILL COMBINED WITH ROTARY DISCHARGE CONVEYOR

Johann Bucher-Guyer, Niederweningen, Switzerland

Application March 7, 1945, Serial No. 581,465
In Switzerland December 29, 1943

5 Claims. (Cl. 146—107)

This invention relates to fruit mills.

In using fruit mills as feeders for pack presses it is customary to arrange the fruit mill directly above the position of the press at which the pack is formed, that is, at the place from where said position is supplied with the material to be formed into packs. In connection therewith the fruit is conveyed into the mill from the bottom of the press room by means of a bucket elevator.

For installing the pack press with the fruit mill situated above the position of pack building, and the bucket elevator for feeding the press, the space for accommodating said parts must have a corresponding height and must otherwise come up to the requirements on available mounting space, particularly if it is taken into consideration that in addition to the press pump also the fruit mill and the bucket elevator need to be individually driven and that the fruit mill, which is arranged at a relatively high level, requires to be cleaned from above, which must frequently take place in thorough manner especially if the production of sweet cider is involved.

With a view to avoiding the abovesaid drawbacks, lately the fruit mill has been arranged in a low position remote from the pack press on the suction vessel of a piston pump which was arranged on the same floor as the press, for the purpose of withdrawing the ground fruit from the suction vessel and conveying it to the place above the pack building position of the press through a pressure conduit. In order to provide for the piston pump to withdraw the tenacious material to be formed into packs at a constant rate the suction vessel must be arranged above the suction conduit of the pump as high as possible whereby, however, the feed funnel comes to lie at such a level which hampers the working of the operator of heaping the fruit into the mill, that is, renders this work most tedious. Since the piston pump and the fruit mill must be separately driven for each of said parts separate driving means must be provided which requires a correspondingly greater amount of space, increases the initial cost and requires more attendance.

Due to the necessity that the supply conduit for the material to be pressed can be throttled above the position of package building at all times during the operation of the pump the arrangement of a return branch from the supply conduit to the suction vessel is imperative in order to prevent the setting up of an excessive pressure rise in the piston pump, which might endanger or even damage the pump and said conduit. Further, the price of the piston pump is high and dependent upon the particular consistency of the goods to be pressed the suction and pressure valves are likely to cause disturbance of operation.

It has also already been attempted to replace the piston pump by a centrifugal pump which would do away with the return branch referred to above for the reason that the centrifugal pump ceases from delivering automatically when on throttling the supply conduit equilibrium of pressure is reached and thus the setting up of an undue rise of pressure in the pump and the supply conduit is made impossible. Experience has however shown that the centrifugal pump fails to withdraw an adequate amount of the tenacious material to be formed into packs even if the suction vessel is arranged at a relatively high level.

The present invention relates to a fruit mill with a rotatable working member for cooperation with the inside of a grinding drum. In order to eliminate the aforesaid drawbacks, according to the present invention, an annular bucket arrangement is provided which surrounds the grinding drum and shares in the rotational movement of the rotatable working member and functions to convey the ground goods discharging through apertures in the grinding drum to the place of delivery. The annular bucket arrangement may be provided on the rotatable working member itself or on a separate carrier member which is advantageously arranged on an actuating shaft in common with the rotatable working member, for the purpose of avoiding the employment of additional driving means for the centrifugal rotor formed by the said carrier member and said annular bucket arrangement.

Owing to the arrangement of an annular bucket arrangement surrounding the grinding drum of the fruit mill for the removal of the ground goods the suction vessel having hitherto been required is dispensed with so that the fruit mill can be mounted on the floor directly and the space requirement in height for the heaping of the material to be ground is accordingly reduced and the attendance is correspondingly facilitated.

Since the piston pump provided with a suction vessel inclusive of the driving means therefor is done away with not only the space requirement for the fruit treating apparatus is correspondingly reduced so that the installation of the fruit mill can be easily effected even under entirely unfavorable conditions as to available space, and also the initial costs are reduced as well as the attendance.

Owing to the kind of arrangement as adopted for placing the annular bucket arrangement about the grinding drum the conveyance of material can be effected free from disturbance, that is in reliable manner, even if the material to be ground is of an extreme tenacity, and the return conduit connecting the presence conduit with the suction vessel is no longer necessary. By this means the fruit treatment apparatus is further simplified and the initial costs are accordingly reduced especially if the fruit mill is mounted remote from the press room, for example, at the place of fruit supply far away from the press.

Advantageously, access to the rotatable working member and to the annular bucket arrangement is provided by means of a cover which is detachably arranged on the casing of the fruit mill and is preferably pivotally arranged.

Advantageously, in this cover is arranged an additional bearing for the respective end of the actuating shaft for the rotatable working member and the bucket arrangement for the purpose of preventing this shaft from deflecting by the effect of solid foreign matter having penetrated into the grinding room.

Two embodiments of the present invention are illustrated, by way of example only, in the accompanying drawing, in which Figs. 1 and 2 depict the general layout of the whole fruit treating apparatus for facilitating the understanding thereof in an elevational and a top plan view respectively;

Figure 1:
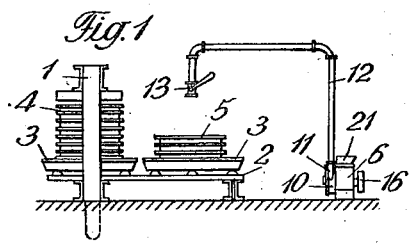
Figure 2:
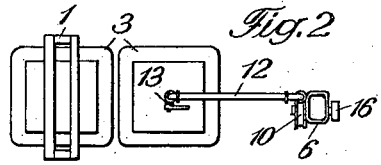

In Figs. 1 and 2, the numeral 1 designates the pack press and by 2 a track for conveying the stock trucks 3 is referred to, whereas packs which are situated within the embrace of the compressing place, that is, the pack preparing place are denoted by 4 and 5 respectively. The casing 6 of the fruit mill which is mounted on the floor directly and which in the first embodiment of the invention (Figs. 3 to 5) carries a stationary grinding drum 7 is provided on the inner circumference thereof with indented knives 8 which are arranged in radial grooves at uniform spacings apart.

Adjacent each knife 8 in the grinding drum 7 a discharge slot 9 for the ground goods is provided. The circular grinding drum 7 is surrounded at a distance away from said drum by a spiral shaped wall 10 which carries an outlet pipe connection 11 with which is connected a pipe conduit 12 for conveying the ground goods into the pack preparing range of the press, as shown in Fig. 1. The pipe conduit, that is, the delivery conduit 12 is provided at the discharge end thereof with a throttle valve 13 which permits of interrupting the discharge of the ground goods, at will, during the operation of the mill.

Figure 3:
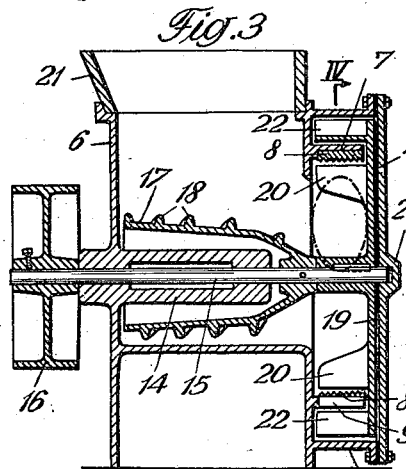
Fig. 3 shows an axial section on the broken line III—III in Fig. 4 representing a first embodiment of the present invention.
Figure 4:
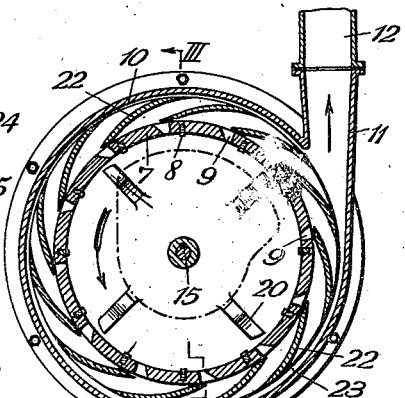
Fig. 4 shows a vertical section on the line IV—IV in Fig. 3.
Figure 5:
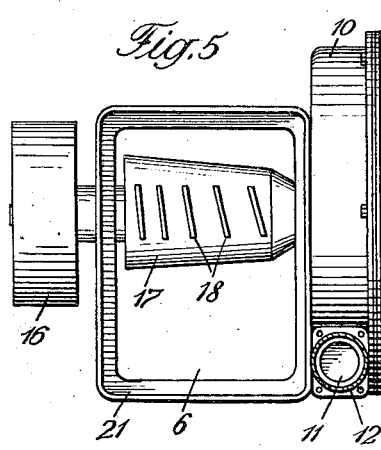
Fig. 5 is a top plan view of Fig. 3.

In the embodiment according to the present invention as shown in Figs. 3 to 5, a horizontal actuating shaft 15 is mounted by means of two bearings in a mounting sleeve 14 which is arranged in the mill casing 6. This shaft carries at one end a driving pulley 16 which is intended to be driven by a driving belt. Instead of a belt drive, an electric motor may be flanged to the casing 6 for directly driving the actuating shaft 15. The actuating shaft 15 is provided with auger conveyor elements 17 which are formed of discontinuous screw threads 18. The shaft 15 further carries the rotatable working member 19 which is keyed to this shaft and is provided with four blades 20 which are uniformly spaced apart in the circumferential direction of the shaft.

The blades 20 serve for moving along the fruit conveyed onto their paths of movement by the conveyor 17. The blades 20 of the rotatable working member 19 cooperate with the stationary grinding drum 7 so that the fruit is disintegrated in the required manner by action of the stationary knives and is then expelled through the discharge slots 9 in conjunction with the action of centrifugal force. On the mill casing 6 a feed hopper 21 is arranged which is omitted from Fig. 5.

Associated with the rotatable working member 19 is an annular bucket arrangement including curved vanes 22 on the path of movement of which the ground goods discharging from the slots 9 in the stationary grinding drum 7 enter in order to be flung by the vanes 22 of the rotatable working member, acting as a centrifugal rotor, into the outlet pipe connection 11 and then to be delivered through the pipe conduit 12 to the place of delivery.

The arcuate outline of the annular vane arrangement is concentric with the actuating shaft 15 so that between the said annular vane arrangement and the spiral shaped drum wall 10 a gap 23 is left which widens uniformly in the direction of rotation of the working member 19 as indicated by the arrow shown in Fig. 4 towards the outlet pipe connection 11 for receiving the ground goods discharging from the annular bucket arrangement and guiding same towards the outlet pipe connection 11.

On the face of the spiraled wall 10 remote from the casing 6 a lateral closure member 24 is detachably fastened, by means of screws, which serves for giving access to the actuating shaft 15 as well as to the rotatable working member 19 and so forth. If desired, the closure member 24 can be pivotally arranged on the spiraled wall 10 in the manner of a lid. The closure member 24 terminates centrally in a bearing 25 which receives the corresponding end of the actuating shaft 15.

Consequently the actuating shaft 15 is supported at the respective end portions thereof by means of the closure member 24 together with the bearing sleeve 14 at both ends of the rotatable working member 19 and of the auger conveyer 17 for preventing this shaft from deflecting under the influence of hard foreign particles that may happen to enter the zone of operation of the rotatable working member 19.

Figure 6:
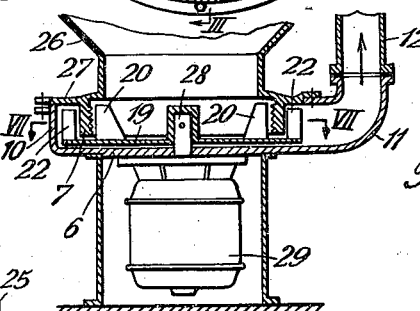
Fig. 6 shows an axial section of a second embodiment of the present invention representing a mill which is provided with a vertical actuating shaft.
Figure 7:
Fig. 7 represents a horizontal section on the line VII—VII in Fig. 6.
Figures 8, 9:
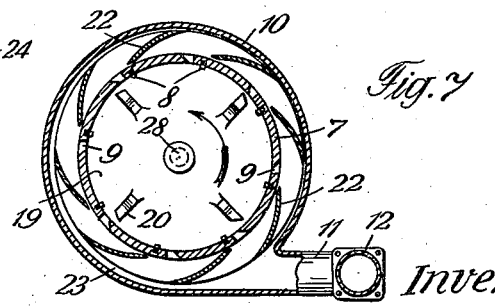
Figs. 8 and 9 are enlarged sectional views taken at right angles to each other, showing the relationship of the knives and discharge slots in the grinding drum.

In the second embodiment of the present invention as shown in Figs. 6 and 7, a feed hopper for the fruit is designated in Fig. 6 by 26. The hopper 26 is provided with a lower peripheral flange which constitutes a cover 27 which is detachably secured to the spiraled wall 10 which also in this case surrounds the annular arrangement of vanes 22 associated with the rotatable working member 19.

The rotatable working member 19 is in this arrangement secured to the vertical actuating shaft stub 28 which is formed direct by the rotor shaft of an electric driving motor 29 which is in form of a flange motor and is screwed to a wall of the mill casing 6. The grinding drum 7 provided with the knives 8 is in this instance arranged on the cover 27. The operation of this embodiment of the invention will be readily understood from the description of the preceding embodiment.

The annular arrangement of vanes 22 being arranged on the rotatable working member 19 and surrounding the grinding drum may, alternatively, be provided on a separate support which shares in the rotational movement of the rotatable working member by being arranged on a common shaft together with said member, thereby to do away with separate driving means for the annular vane arrangement also in this case.

In certain circumstances the fruit mill may be used for feeding several pack presses provided that corresponding branch conduits are combined with a main supply pipe line. Instead of using a flange motor, as shown in Fig. 7, the driving movement may be derived below the rotatable working member by means of a belt pulley from a horizontal counter drive shaft which would be operatively connected with the vertical actuating shaft of the rotatable working member by means of a bevel wheel drive.

I claim:

1. In a fruit mill, a stationary cylindrical grinding drum, a rotatable working member arranged in said drum, an inner working surface on said grinding drum for disintegrating the fruit material to be treated in the mill cooperating with said working member, said grinding drum having apertures on its cylindrical wall for discharging the disintegrated fruit material therethrough out of said drum, an annular bucket arrangement rotating together with said working member surrounding said grinding drum for cooperation with the discharge apertures in said drum wall, vanes defining the buckets of said arrangement for conveying said discharged fruit material through said buckets, and a supply conduit communicating with said buckets for supplying said discharged fruit material to a place of delivery.

2. In a fruit mill, a stationary cylindrical grinding drum, a rotatable working member arranged in said drum by means of an actuating shaft, an inner working surface on said grinding drum for disintegrating the fruit material to be treated in the mill cooperating with said working member, said grinding drum having apertures on its cylindrical wall for discharging the disintegrated fruit material therethrough out of said drum, an annular bucket arrangement driven by said actuating shaft for rotating together with said working member surrounding said grinding drum for cooperation with the discharge apertures in said drum wall, vanes defining the buckets of said arrangement for conveying said discharged fruit material through said buckets, and a supply conduit communicating with said buckets for supplying said discharged fruit material to a place of delivery.

3. In a fruit mill, a stationary cylindrical grinding drum, a rotatable working member arranged in said drum by means of an actuating shaft, an inner working surface on said grinding drum for disintegrating the fruit material to be treated in the mill cooperating with said working member, said grinding drum having apertures on its cylindrical wall for discharging the disintegrated fruit material therethrough out of said drum, an annular bucket arrangement united with said working member for rotating together with said member in coaxial relation to said actuating shaft surrounding said grinding drum for cooperation with the discharge apertures in said drum wall, vanes defining the buckets of said arrangement for conveying said discharged fruit material through said buckets, and a supply conduit communicating with said buckets for supplying said discharged fruit material to a place of delivery.

4. In a fruit mill, a stationary cylindrical grinding drum, a rotatable working member arranged on said drum by means of an actuating shaft, an inner working surface on said grinding drum for disintegrating the fruit material to be treated in the mill cooperating with said working member, said grinding drum having apertures on its cylindrical wall for discharging the disintegrated fruit material therethrough out of said drum, an annular bucket arrangement sharing in the rotational movement of said working member by means of a separate support by rotating together with said member in coaxial relation to said actuating shaft surrounding said grinding drum for cooperation with the discharge apertures in said drum wall, vanes defining the buckets of said arrangement for conveying said discharged fruit material through said buckets, and a supply conduit communicating with said buckets for supplying said discharged fruit material to a place of delivery.

5. In a fruit mill provided with a frame encompassing the mill, a stationary cylindrical grinding drum, a rotatable working member arranged in said drum by means of an actuating shaft mounted in bearings, an inner working surface on said grinding drum for disintegrating the fruit material to be treated in the mill cooperating with said working member, said grinding drum having apertures on its cylindrical wall for discharging the disintegrated fruit material therethrough out of said drum, an annular bucket arrangement rotating together with said working member surrounding said grinding drum for cooperation with the discharge apertures in said drum wall, vanes defining the buckets of said arrangement for conveying said discharged fruit material through said buckets, a closure member detachably arranged on an accessible portion on said frame within the embrace of said shaft for giving access to said working member and said bucket arrangement, an additional bearing arranged on said closure member for said actuating shaft, and a supply conduit communicating with said buckets for supplying said discharged fruit material to a place of delivery.

JOHANN BUCHER-GUYER.

REFERENCES CITED

The following references are of record in the file of this patent:

UNITED STATES PATENTS

| Number | Name | Date |
|---|---|---|
| 549,264 | Ball | Nov. 5, 1895 |
| 2,011,211 | Brown | Aug. 13, 1935 |
| 2,223,739 | Newton | Dec. 3, 1940 |
| 2,240,213 | Fromny | Apr. 29, 1941 |
| 979,063 | Edwards | Dec. 20, 1910 |
| 2,156,075 | Alexay | Apr. 25, 1939 |